(12) United States Patent
Suita (10) Patent No.: US 11,331,962 B2
(45) Date of Patent: May 17, 2022

(54) TIRE AND TIRE MANUFACTURING METHOD

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 16/589,756

(22) Filed: Oct. 1, 2019

(65) Prior Publication Data

US 2020/0112079 A1 Apr. 9, 2020

(30) Foreign Application Priority Data

Oct. 3, 2018 (JP) .............................. JP2018-188134

(51) Int. Cl.
*B60C 15/06* (2006.01)
*H01Q 1/22* (2006.01)
*B60C 19/00* (2006.01)

(52) U.S. Cl.
CPC .......... *B60C 15/06* (2013.01); *B60C 15/0603* (2013.01); *H01Q 1/2241* (2013.01); *B60C 15/0628* (2013.01); *B60C 15/0635* (2013.01); *B60C 2015/0625* (2013.01); *B60C 2019/004* (2013.01)

(58) Field of Classification Search
CPC .............. H01Q 1/2241; B60C 15/0603; B60C 2019/004; B60C 2015/0621; B60C 2015/0625; B60C 15/06; B60C 15/0607; B60C 2015/0614; B60C 19/00; B60C 2015/0617; B29D 30/0061; B29D 30/48; B29D 2030/0077; B29D 2030/486

USPC .................................................... 152/539, 543
See application file for complete search history.

(56) References Cited

U.S. PATENT DOCUMENTS

| 5,196,077 A * | 3/1993 | Kaga ...................... B60C 15/06 |
| | | 152/539 |
| 6,921,197 B2 | 7/2005 | Aubel et al. |
| 7,036,541 B2 | 5/2006 | Maruoka et al. |

(Continued)

FOREIGN PATENT DOCUMENTS

| CN | 101279574 A | 10/2008 |
| CN | 101734112 A | 6/2010 |

(Continued)

OTHER PUBLICATIONS

Takano Kosuke, JP-2017222294-A, updated machine translation. (Year: 2017).*

(Continued)

*Primary Examiner* — Katelyn W Smith
*Assistant Examiner* — Sedef E Paquette
(74) *Attorney, Agent, or Firm* — Maier & Maier, PLLC (57) ABSTRACT

A tire including a bead core, a bead filler extending to an outer side in a tire-radial direction of the bead core, and a carcass play extending from the bead core to another bead core and folded back around the bead core, further including a steel chafer arranged so as to cover the carcass ply around the bead core, a first pad which covers outside in the tire-width direction of a folding end of the carcass ply at the outside in the tire-radial direction of an end part of the steel chafer, and a second pad which covers the outer side in the tire-width direction of the first pad, in which an electronic component is provided between the first pad and second pad.

4 Claims, 7 Drawing Sheets

(56) References Cited

U.S. PATENT DOCUMENTS

| | | |
|---|---|---|
| 8,905,102 B2 | 12/2014 | Nishio |
| 2005/0257868 A1 | 11/2005 | Adamson |
| 2006/0000199 A1 | 1/2006 | Domingo et al. |
| 2008/0289736 A1 | 11/2008 | Adamson et al. |
| 2010/0123584 A1 | 5/2010 | Lionetti et al. |
| 2011/0175778 A1 | 7/2011 | Myatt |
| 2012/0318427 A1* | 12/2012 | Nishio .................. B60C 15/06 152/541 |
| 2016/0107490 A1 | 4/2016 | Randall et al. |
| 2016/0114633 A1 | 4/2016 | Miyasaka |
| 2016/0236521 A1* | 8/2016 | Yukawa .............. B60C 17/0009 |
| 2016/0303921 A1 | 10/2016 | Miklic et al. |
| 2019/0322142 A1 | 10/2019 | Lallement et al. |
| 2020/0079159 A1 | 3/2020 | Destraves et al. |
| 2020/0247193 A1 | 8/2020 | Nakajima et al. |

FOREIGN PATENT DOCUMENTS

| | | |
|---|---|---|
| CN | 105813863 A | 7/2016 |
| EP | 2 524 818 A2 | 11/2012 |
| EP | 3 196 056 A1 | 7/2017 |
| EP | 3315322 A1 | 5/2018 |
| FR | 3 059 603 A1 | 6/2018 |
| JP | 2002052909 A | 2/2002 |
| JP | 2005-335384 A | 12/2005 |
| JP | 2008265750 A | 11/2008 |
| JP | 2011105076 A | 6/2011 |
| JP | 2012096727 A | 5/2012 |
| JP | 2012106531 A | 6/2012 |
| JP | 2013001223 A | 1/2013 |
| JP | 2016037235 A | 3/2016 |
| JP | 2016037236 A | 3/2016 |
| JP | 2016049920 A | 4/2016 |
| JP | 2016539047 A | 12/2016 |
| JP | 2017222294 A | 12/2017 |
| JP | 2017537013 A | 12/2017 |
| WO | 03/105509 A1 | 12/2003 |
| WO | 2011/002440 A1 | 1/2011 |
| WO | 2015088890 A1 | 6/2015 |
| WO | 2018/104623 A1 | 6/2018 |

OTHER PUBLICATIONS

Extended European Search Report dated Jan. 28, 2020, including the European Search Report and the European Search Opinion, in connection with corresponding EP Application No. 19200343.2 (5 pgs.).

Notice of Reasons for Refusal, dated Jun. 4, 2019, in corresponding Japanese application No. 2018-188134; 10 pages.

Decision to Grant a Patent dated Aug. 27, 2019, in corresponding JP Application No. 2018-188134; 5 pages.

Office Action issued in the related U.S. Appl. No. 16/902,592, dated Jan. 7, 2022, 14 pgs.

Office Action issued in the related U.S. Appl. No. 16/902,592, dated Sep. 20, 2021, 7 pgs.

\* cited by examiner

TIRE AND TIRE MANUFACTURING METHOD

CROSS-REFERENCE TO RELATED APPLICATIONS

This application is based on and claims the benefit of priority from Japanese Patent Application No. 2018-188134, filed on 3 Oct. 2018, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application Publication No. 2008-265750 discloses a tire in which an electronic component is arranged at the boundary surface of two difference substances. The boundary surface of two substances at which this electronic component is arranged is a surface extending from a free edge of a carcass ply.

SUMMARY

With the technology shown, the boundary surface between two substances at which the electronic component is arranged becomes a surface extending from a free edge of the carcass ply; however, at this portion, stress and distortion tends to occur upon the tire deforming. Therefore, the electronic portion arranged at this portion is affected by the stress and distortion upon the tire deforming, and there is a possibility of no longer maintaining the function as an electronic component.

The present invention has been made taking account of the above-mentioned problem, and an object thereof is to provide a tire which can maintain the function of an embedded electronic component, by arranging the electronic component at a position which is hardly affected by the stress and distortion within the tire structure.

A tire according to a first aspect of the present invention includes: a bead core; a bead filler which extends to an outer side in a tire radial direction of the bead core; a carcass ply which extends from the bead core to another bead core and is folded around the bead core; a reinforcement ply disposed so as to cover the carcass ply around the bead core; a first pad which covers an outer side in a tire-width direction of a folding end of the carcass ply which was folded back, at an outer side in the tire-radial direction of an end part of the reinforcement ply; and a second pad which covers an outer side in the tire-width direction of the first pad, in which an electronic component is provided between the first pad and the second pad.

According to a second aspect of the present invention, in the tire as described in the first aspect, the electronic component may be provided at a position distanced by at least 5 mm from the folding end of the carcass ply.

According to a third aspect of the present invention, in the tire as described in the first or second aspect, the electronic component may be covered by at least one rubber sheet, and the rubber sheet covering the electronic component may be disposed at a tire-radial direction outside end of the first pad.

According to a fourth aspect of the present invention, in the tire as described in any one of the first to third aspects, a modulus of the first pad and a modulus of the second pad may be higher than a modulus of the bead filler.

According to a fifth aspect of the present invention, in a tire manufacturing method of manufacturing the tire as described in the first aspect, the electronic component may be covered by at least one rubber sheet, and the method may include, prior to a vulcanization step of vulcanizing green tire, a pasting step of aligning a longitudinal direction of the rubber sheet covering the electronic component in a direction of a tangential line to an outer circumferential part of the first pad, and pasting the rubber sheet to the first pad, with a reference of the outer circumferential part of the first pad.

According to a sixth aspect of the present invention, in the tire manufacturing method as described in the fifth aspect may further include a covering step of covering the electronic component to be pasted in the pasting step by rubber sheets, in which the covering step may include: a step of arranging rubber within a spring antenna of the electronic component; and a step of interposing, by the rubber sheets, the electronic component having the spring antenna into which the rubber was arranged.

According to the present invention, it is possible to provide a tire which can maintain the function of an embedded electronic component, by arranging the electronic component at a position which is hardly affected by the stress and distortion within the tire structure.

DETAILED DESCRIPTION

First Embodiment

Figure 1:
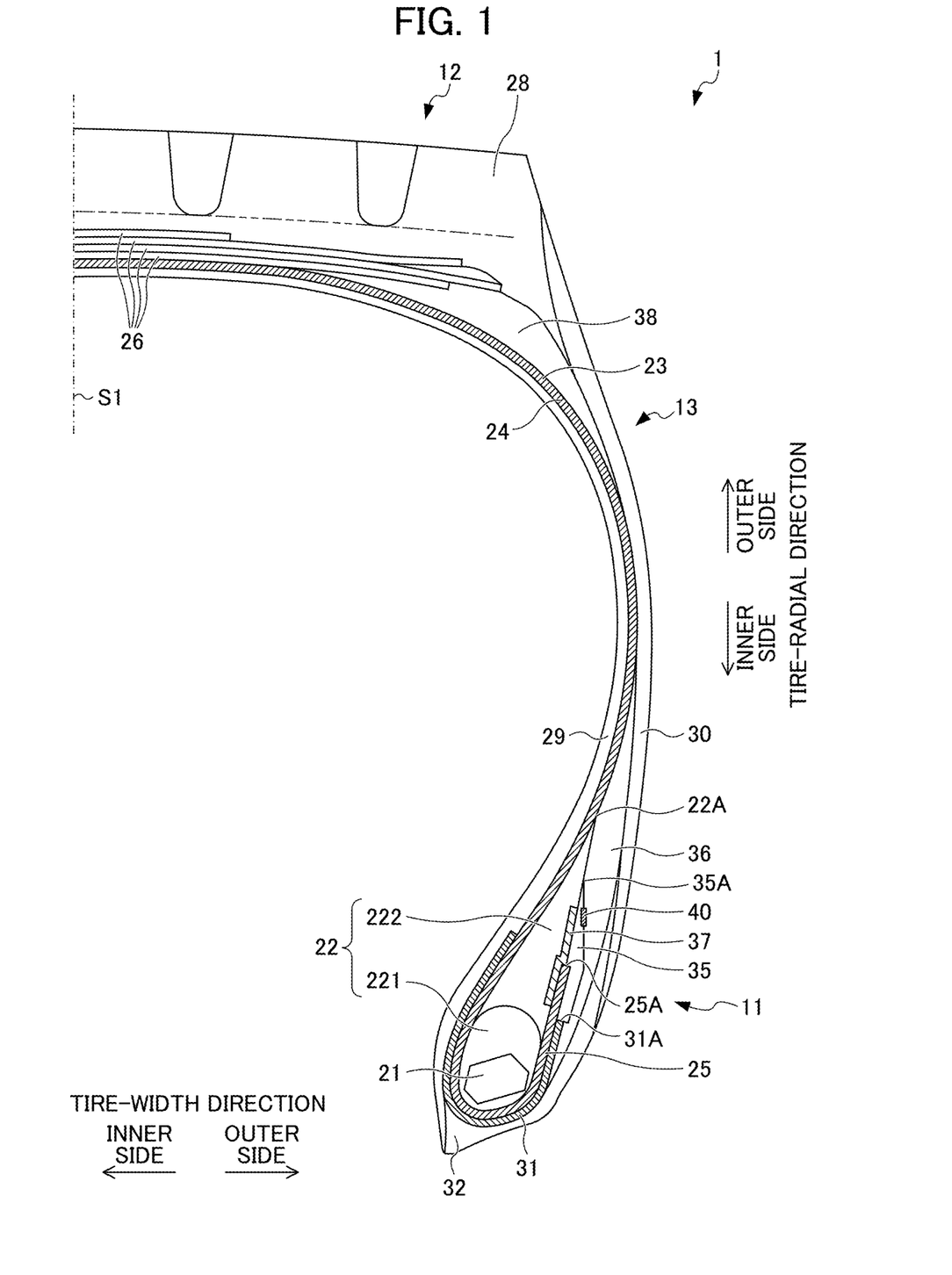
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2 and 5.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, in a region between the carcass ply 23, and the steel belts 26/tread rubber 28, a shoulder pad 38 is provided. This shoulder pad 38 extends until a region of the outer side in the tire-radial direction of the side wall 13, and part thereof forms an interface between side wall rubber 30 described later. In other words, in the region of the outer side in the tire radial direction of the side wall 13, a part of the shoulder pad 38 is present on the inner side in the tire width direction of the side wall rubber 30. The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover the carcass ply 23. The steel chafer 31 also extends to the outer side in the tire-width direction of the ply folding part 25 of the carcass ply 23, and an end part 31A of this steel chafer 31 is positioned more to the inner side in the tire-width direction than the folding end 25A of the ply folding part 25. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad 35 is provided so as to cover the outer side in the tire-width direction of at least the folding end 25A of the ply folding part 25. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. In other words, the second pad 36 is provided between the first pad 35, etc., and the rim strip rubber 32 and side wall rubber 30, which are members constituting the outer surface of the tire.

Herein, the first pad 35 and second pad 36 are configured by rubber of higher modulus than the modulus of the bead filler (second bead filler 222) to which these members contact. In more detail, the second pad 36 is configured by rubber of higher modulus than the second bead filler 222, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

At the inner side in the tire-width direction of the first pad 35, a rubber sheet 37 is arranged in the vicinity of the folding end 25A of the ply folding part 25. The rubber sheet 37 is arranged so as to cover at least the folding end 25A of the ply folding part 25 from the inner side in the tire-width direction.

Generally, at the folding end 25A of the ply folding part 25, stress tends to concentrate. However, by providing the aforementioned first pad 35 and second pad 36, and further arranging the rubber sheet 37, it becomes possible to effective suppress the concentration of stress.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
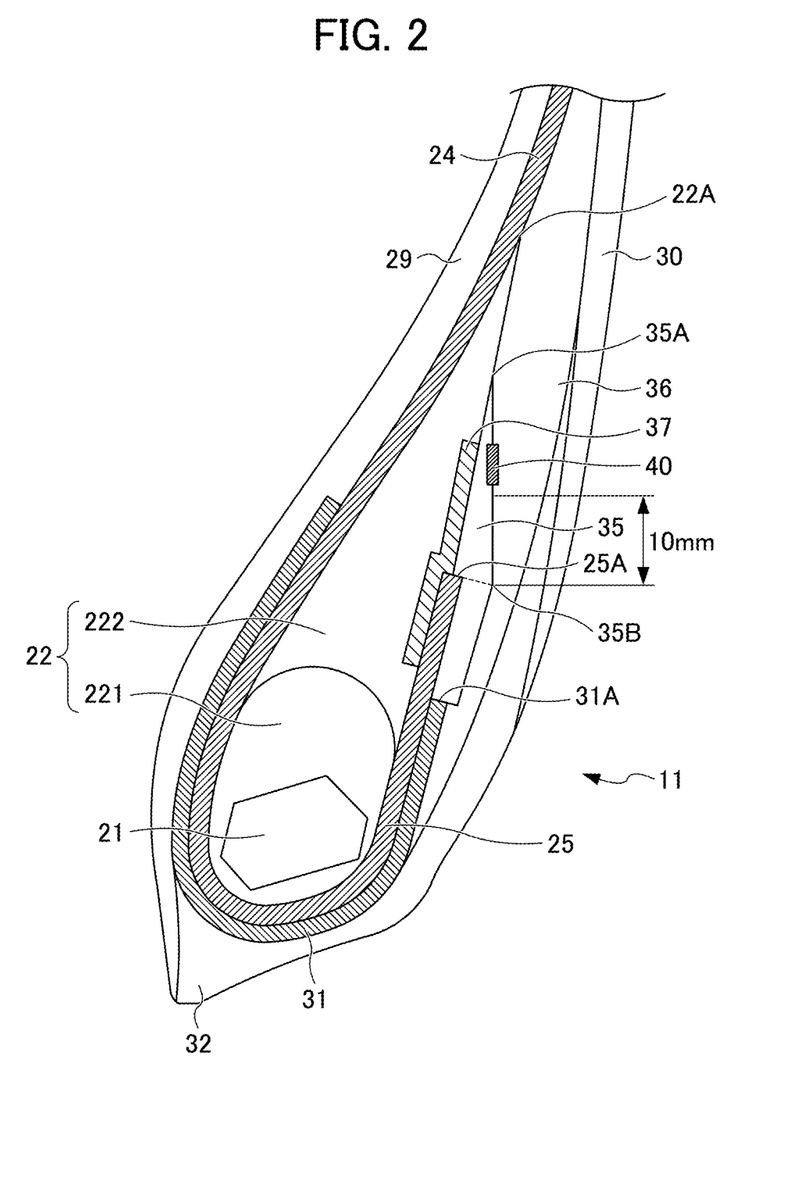
FIG. 2 is a partially enlarged cross-sectional view of a tire according to the first embodiment of the present invention.

FIG. 2 is an enlarged cross-sectional view showing the periphery of an embedded part of the RFID tag 40 in the tire 1 of FIG. 1. As shown in FIGS. 1 and 2, the RFID tag 40 is embedded between the first pad 35 and second pad 36.

Normally, in a case of the boundary surface of two substances being the surface extending from the folding end 25A of the carcass ply 23, distortion tends to occur at this surface. In addition, if considering the communication quality, it is preferable for the RFID tag 40 to be arranged as much as possible in a portion close to the outer surface of the tire 1.

Herein, in the present embodiment, the RFID tag 40 is embedded in the boundary surface between the first pad 35 and second pad 36, closer to the outer surface of the tire 1 than the boundary surface between the second bead filler 222 and first pad 35.

The RFID tag 40 can thereby keep the function thereof, without being affected by excessive distortion. Additionally, the RFID tag 40 is very strongly protected due to being arranged to be sandwiched by the first pad 35 and second pad 36 consisting of rubber of higher modulus than the second bead filler 222. Consequently, even when the tire distorts, the RFID tag 40 will receive almost no damage.

It should be noted that, when defining the modulus of the second bead filler 222 as the reference, it is preferable for the first pad 35 to establish a modulus of at least 1.5 times that of the second bead filler 222, more preferably a modulus of at least 1.5 to 2 times thereof, and even more preferably a modulus of 1.5 to 1.7 times thereof. In addition, the second pad preferably establishes a modulus of 1.1 times that of the second bead filler 222, more preferably a modulus of 1.1 to 1.5 times thereof, and even more preferably 1.3 to 1.5 times thereof. By establishing such a modulus, it is possible to keep a balance of flexibility as a tire and rigidity in the vicinity of the bead 11, and possible to strongly protect the RFID tag 40. It should be noted that the modulus indicates 100% elongation modulus (M100) under a 23° C. atmosphere, measured in accordance with "3.7 stress at a given elongation, S" of JIS K6251:2010.

Herein, when considering the communication quality, the RFID tag 40 is preferably arranged at a position separated at least 5 mm from the folding end 25A of the ply folding part 25, and more preferably at a position separated by at least 10 mm. Generally, for an electronic device such as the RFID tag 40 having a communication function, the communication state thereof becomes unstable when receiving the influence of metal components. However, by arranging the RFID tag 40 at the aforementioned position, even in a case of the carcass ply 23 being formed from metal steel cord, it is possible to keep the communication quality of the RFID tag 40.

In addition, even viewing from the aspect of strain energy, it is preferable for the RFID tag 40 to be arranged at a position distanced by at least 5 mm from the folding end 25A of the ply folding part 25, and more preferably at a position distanced by at least 10 mm. This point will be explained using the graph of FIG. 3.

Figure 3:
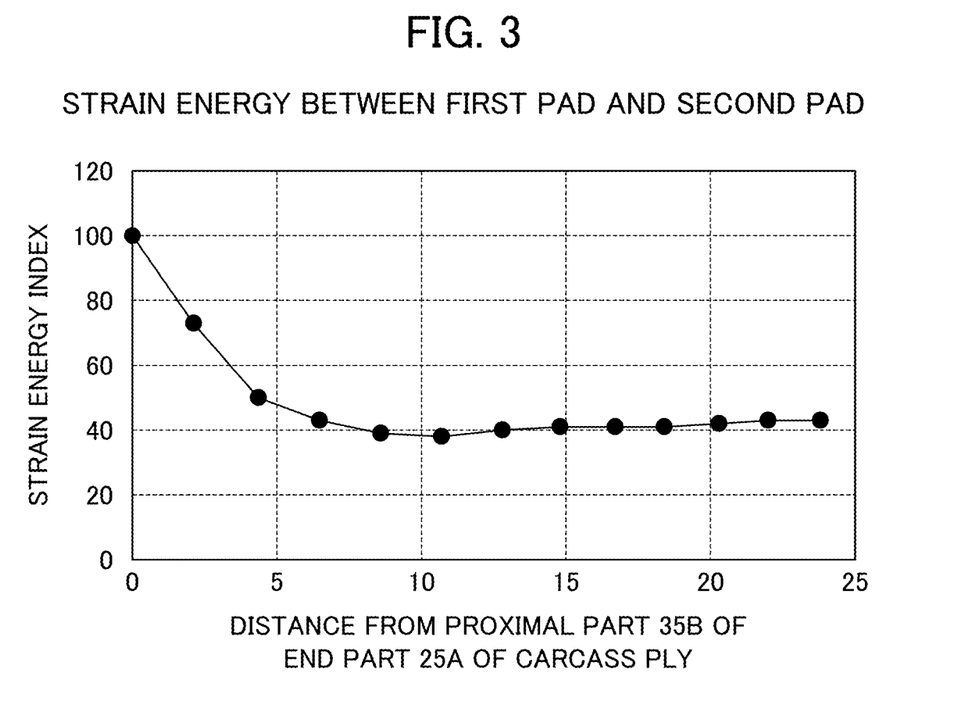
FIG. 3 is a graph showing a strain energy index in a case of applying load on the tire according to the first embodiment of the present invention.

FIG. 3 is a graph showing a strain energy index in the case of applying load to the tire of the present embodiment. The X axis in this graph is the distance along the outside surface in the tire-width direction of the first pad 35 from a proximal part 35B of the folding end 25A of the ply folding part 25, and the Y axis is the strain energy index. Herein, the proximal part 35B of the folding end 25A of the carcass ply 23 is prescribed by the point of intersection between a line drawn from the ply folding end 25A of the carcass ply 23 in a direction orthogonal to the extending direction of the ply folding part 25 (shown by a dotted line in FIG. 2) and a line showing the outside surface in the tire-width direction of the first pad 35, in a cross-sectional view in the tire-width direction, as shown in FIG. 2. As is evident from this graph, the strain energy index drastically decreases by being distanced by at least 5 mm from the proximal part 35B of the folding end 25A of the ply folding part 25. Furthermore, the strain energy index is stable at a low value by being distanced by at least 10 mm. In other words, it is substantially found that, if at a position distanced by at least 5 mm from the folding end 25A of the ply folding part 25, the strain energy index will drastically decrease, and furthermore, if at a position distanced by at least 10 mm, the strain energy index will be stable at a low value.

In view of the above, it is preferable for the RFID tag 40 to be arranged at a position distanced by at least 5 mm from the folding end 25A of the ply folding part 25, and more preferably at a position distanced by at least 10 mm.

Herein, the RFID tag 40 is mounted before the vulcanization process in the manufacturing process of tires. In the present embodiment, the RFID tag 40 is mounted to the first pad 35 or second pad 36 prior to the rubber being vulcanized. At this time, the first pad 35 and second pad 36 are in the state of raw rubber prior to vulcanization; therefore, the RFID tag 40 may be pasted to the first pad 35 or second pad 36 using the adhesive property thereof. Alternatively, in a case of the adhesive property being low or the like, it may be pasted using an adhesive or the like. After pasting the RFID tag 40, the RFID 40 is interposed by the first pad 35 and second pad 36. Subsequently, the green tire in which the respective constitutional parts including the RFID 40 are assembled is vulcanized in the vulcanization process to manufacture a tire.

In this way, in the present embodiment, since it is possible to paste the RFID tag 40 to the first pad 35 or second pad 36 in the raw rubber state, at the time of tire manufacture, the assembly work of the RFID tag 40 in the manufacturing process of the tire is easy. In particular, the first pad and second pad have a certain rigidity even in the raw rubber state, and thus the assembly work of the RFID tag 40 is easy.

It should be noted that the RFID tag 40 embedded in the tire, when including an antenna, often has a longitudinal direction, as shown as the RFID tag 40 in FIG. 4 described later. It is preferable for such an RFID tag 40 to be embedded in the tire 1, so that the longitudinal direction thereof is a direction of the tangential line to the circumferential direction of the tire, i.e. direction orthogonal to the paper plane in the cross-sectional views of FIGS. 1 and 2. By embedding in this way, stress is hardly applied to the RFID tag 40, when the tire deforms.

It should be noted that, in the mounting step of the RFID tag 40 described above, upon aligning so that the longitudinal direction of the RFID tag 40 and the tangential line direction of the ridgeline of the outside end in the tire-radial direction of the first pad 35 (outer circumferential part of first pad 35 forming a ring shape when viewed from the outer side of the tire-width direction) match, the RFID tag 40 is pasted. In this way, it is possible to simply arrange the RFID tag 40 in the aforementioned direction, without giving special marks, by establishing the ridgeline of the outside end in the tire-radial direction of the first pad 35 (outer circumferential part of the first pad 35) as a reference. In addition, according to this method, it is possible to simply arrange the RFID tag 40 at the outside end in the tire-radial direction of the first pad 35, which is a position at the strain energy is low, and far from metal components.

It should be noted that the RFID tag 40 may be interposed between the first pad 35 and second pad 36 in a state covered by a protective member of rubber or the like; however, it may be interposed directly by the first pad 35 and second pad 36, without covering with a protective member. Even in this case, since the RFID tag 40 is protected by being interposed by the first pad 35 and second pad 36, the durability of the RFID tag 40 improves.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. In addition, there is a possibility of the electronic component being damaged by excessive stress being applied. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) With the tire 1 according to the present embodiment, the RFID tag 40 is provided between the first pad 35 and second pad 36. The RFID tag 40 can thereby keep the function thereof, without being affected by excessive distortion.

(2) With the tire 1 according to the present embodiment, the RFID tag 40 is provided at a position distanced by at least 5 mm from the folding end 25A of the carcass ply 23. It is thereby possible to keep the communication quality of the RFID tag 40, even in a case of the carcass ply 23 being formed by a metal steel cord.

(3) The tire 1 according to the present embodiment, the modulus of the first pad 35 and second pad 36 is higher than the modulus of the second bead filler 222. The RFID tag 40 is arranged to be interposed by the first pad 35 and second pad 36 consisting of rubber of higher modulus than the second bead filler 222; therefore, it is thereby very strongly protected. Consequently, even in a case of the tire distorting, the RFID tag 40 will receive almost no damage.

Second Embodiment

Next, a tire according to a second embodiment will be explained while referencing FIGS. 4A to 4C. It should be noted that, in the following explanation, the same reference symbol will be attached for configurations which are the same as the first embodiment, and detailed explanations thereof will be omitted.

Figure 4A:
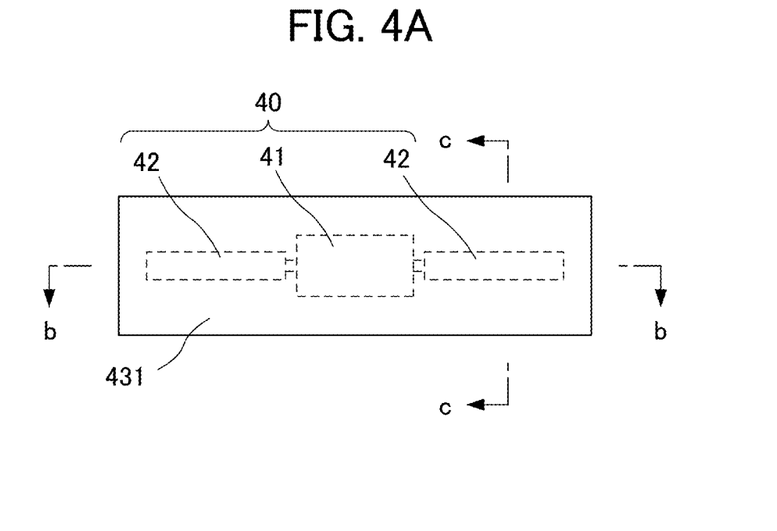
FIG. 4A is a view showing an RFID tag which is protected by a protective member in a tire according to a second embodiment of the present invention.
Figure 4B:
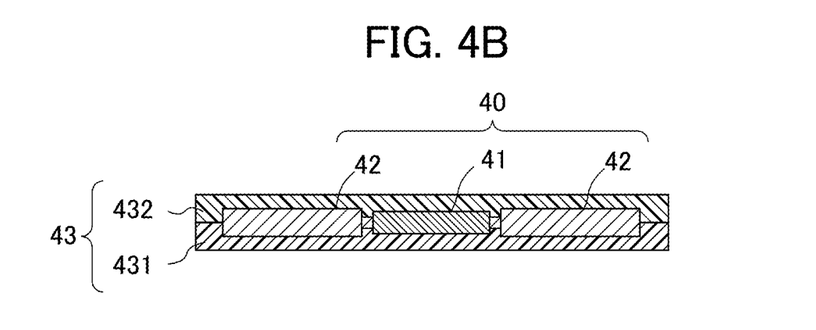
FIG. 4B is a view showing along the cross section b-b in FIG. 4A.
Figure 4C:
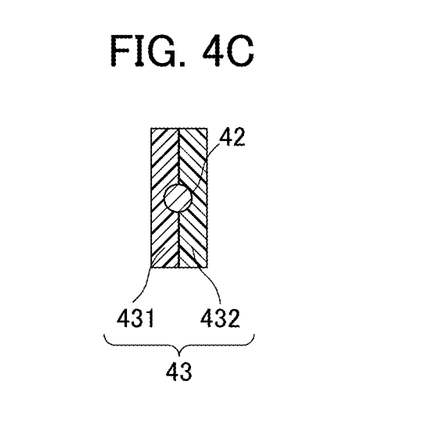
FIG. 4C is a view showing along the cross section c-c in FIG. 4A.

FIG. 4A is a view showing the RFID tag 40 covered by a protective member 43 configured from a rubber sheet. In FIG. 4A, the RFID tag 40 is covered and hidden by the rubber sheet 431 described later. FIG. 4B is a cross-sectional view along the line b-b in FIG. 4A, and FIG. 4C is a cross-sectional view along the line c-c in FIG. 4A. In the present embodiment, as shown in FIGS. 4A to 4C, the RFID tag 40 is covered by the protective member 43.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable. The antenna is established at an antenna length optimized according to the frequency band, etc. to be used.

The protective member 43 is configured from two rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, rubber having a higher modulus than the side wall rubber 30 and lower modulus than the second pad 36 is used.

For example, with the modulus of the side wall rubber 30 as a reference, as the rubber used in the protective member 43, it is preferable to use rubber of a modulus 1.1 to 1.8 times. At this time, as the rubber of the second pad 36, rubber of a modulus 1.6 to 3 times that of the side wall rubber, for example, rubber of a modulus on the order of 2 times thereof, may be used. It should be noted that, if emphasizing reinforcement of the protection of the RFID tag 40, rubber of a modulus higher than the second pad 36 may be adopted as the rubber used in the protective member 43.

It should be noted that, as shown in FIGS. 1 and 2, the RFID tag 40 is arranged in the region between the first pad 35 and second pad 36. Therefore, by setting the modulus of the protective member 43 to a value with a higher modulus than the second pad 36 and a lower modulus than the first pad 35, in the case of the tire distorting, it is possible to prevent excess stress from generating within the rubber structure at the embedded part of the RFID tag 40. In other words, it is possible to suppress the generation of stress.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40.

In addition, as the protective member 43, an organic fiber layer from polyester fibers or polyamide fibers may be provided. It is also possible to embed an organic fiber layer in the two rubber sheets 431, 432.

In this way, if configuring the protective member 43 by two rubber sheets, since it is possible to thinly form the RFID tag including the protective member 43, it is favorable upon embedding in the tire 1. In addition, when assembling the RFID tag 40 in the constitutional members of the tire 1 prior to vulcanization, the RFID tag 40 covered by the rubber sheets can be installed very easily. For example, at a desired position of a member such as the first pad 35 and second pad 36 prior to vulcanization, it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

However, the protective member 43 is not limited to the form configured by two rubber sheets, and can adopt various forms. For example, at least one rubber sheet constituting the protective member, so long as covering at least part of the RFID tag 40, can obtain effects such as an improvement in workability in the manufacturing process and stress mitigation. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if such a configuration, it will be possible to appropriately protect the RFID tag 40.

It should be noted that the RFID tag 40 covered by the protective member 43 is embedded in the tire so that the longitudinal direction thereof becomes the direction of the tangential line relative to the circumferential direction of the tire, i.e. direction orthogonal to the paper plane in the cross-sectional view of FIGS. 1 and 2. In addition, the rubber sheets 431, 432 are embedded in the tire in a form such that aligns in the tire-width direction. In other words, in the manufacturing process, one surface of either one of the rubber sheets 431, 432 is pasted to a constituent member of the tire prior to vulcanization, e.g., the first pad 35. By establishing such a form, stress will hardly act on the RFID tag 40, even when the tire deforms. In addition, in the manufacturing process, the work of attaching the RFID tag 40 covered by the protective member 43 becomes easy.

Figure 5:
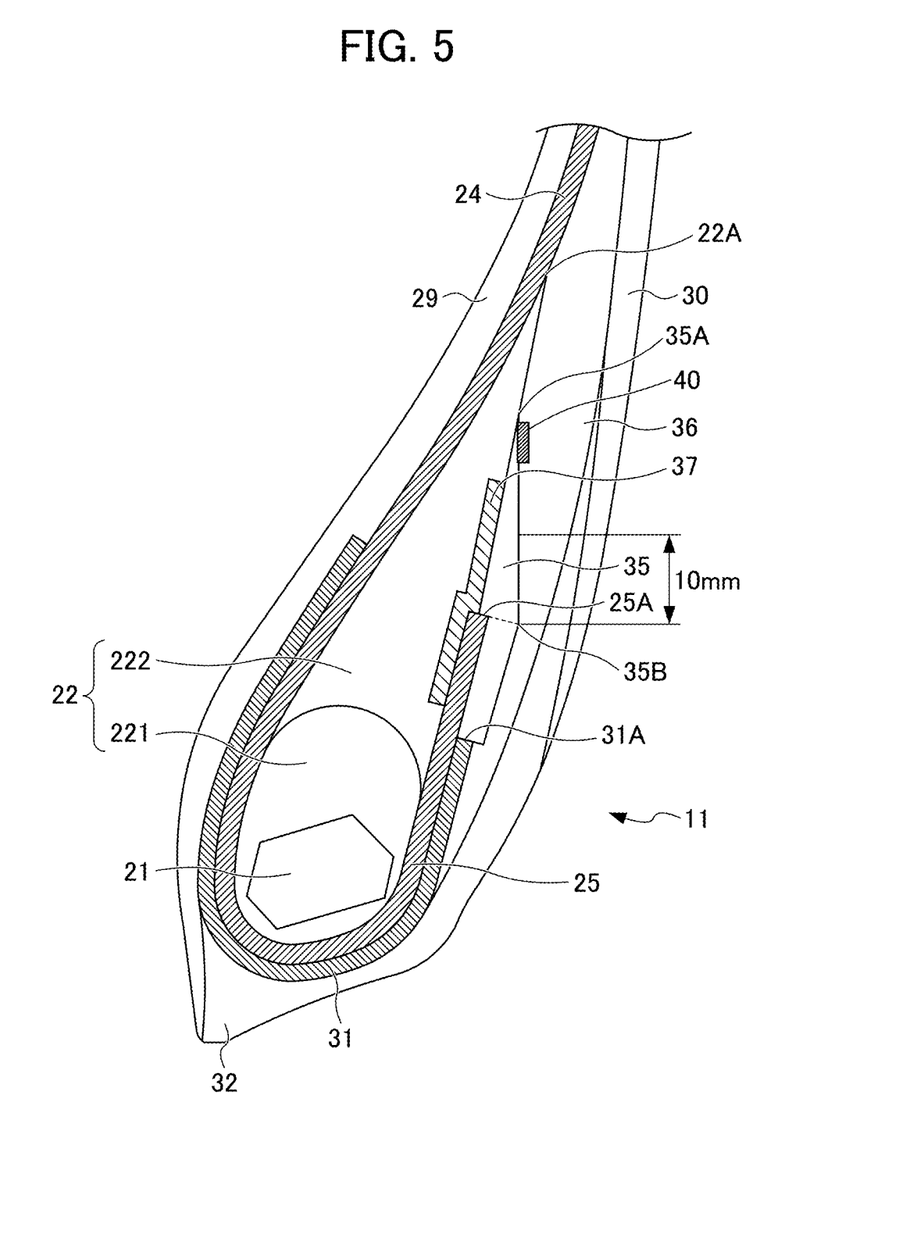
FIG. 5 is a partially enlarged cross-sectional view showing an example of an arrangement position of the RFID tag protected by the protective member.

In the mounting step of the RFID tag 40, by establishing the outer circumferential part of the first pad 35 as a reference, which forms the ridgeline of an outside end part in the tire-radial direction of the first pad 35, in other words, a ring shape when viewing from the outer side in the tire-width direction, it is possible to easily arrange the RFID tag 40 covered by the protective member 43 in the aforementioned direction. In other words, with the outer circumferential part of the first pad 35 as a reference, it is pasted to match the longitudinal direction of the rubber sheets 431, 431 covering the RFID tag 40 with the direction of the tangential line of the outer circumferential part of the first pad 35. According to this method, it is possible to easily arrange the RFID tag 40 covered with the protective member 43 in the aforementioned direction, without giving special marks. In addition, according to this method, in the vicinity of the tire-radial direction outside end 35A of the first pad 35, which has low strain energy, and is a position far from metal components, as shown in FIG. 5, it is possible to easily arrange the RFID tag 40 covered by the protective member 43.

According to the tire of the present embodiment, the following effects are exerted in addition to the above (1) to (3).

(4) In the present embodiment, the RFID tag 40 is covered by the rubber sheets 431, 432, and the rubber sheets 431, 432 covering the RFID tag 40 are arranged at the tire-radial direction outside end 35A of the first pad 35. It is thereby possible to arrange the RFID tag 40 at a position having low strain energy and far from metal components, in a state protected by the rubber sheets 431, 432.

(5) In the present embodiment, the RFID tag 40 is covered by the rubber sheets 431, 432, and prior to a vulcanization step of vulcanizing the green tire, the rubber sheets 431, 432 are pasted to the first pad 35 with the ridgeline of the tire-radial direction outside end of the first pad 35 as a reference. It is thereby possible to easily arrange the RFID rag 40 also in the vicinity of the tire-radial direction outside end 35A of the first pad 35, which is a position having low strain energy, and far from metal components.

(6) In the present embodiment, the protective member 43 is configured from rubber of a modulus higher than the second pad 36, and lower than the first pad 35, and the RFID tag 40 covered by this protective member 43 is embedded in the tire. Consequently, since the modulus of rubber in the tire changes stepwise, in the case of the tire deforming, it is possible to prevent excessive stress occurring within the rubber structure in the RFID tag 40 embedded part.

Third Embodiment

Next, a tire according to a third embodiment will be explained while referencing FIGS. 6 to 12. It should be noted that, in the following explanation, the same reference symbol will be attached for configurations which are the same as the second embodiment, and detailed explanations thereof will be omitted. The present embodiment is a particularly preferable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 6 to 12.

Figure 6:
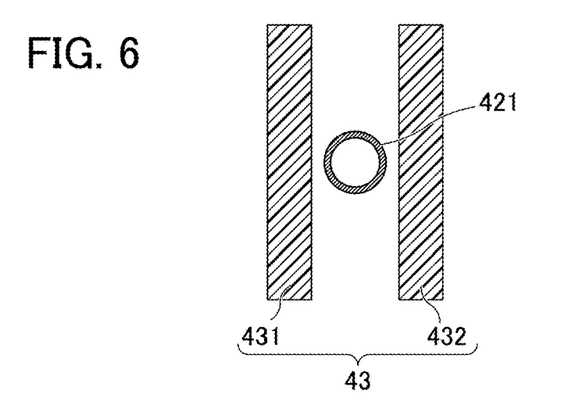
FIG. 6 is a view showing a cross section prior to interposing the RFID tag by rubber sheets in a case of not filling rubber inside a spring antenna.
Figure 7:
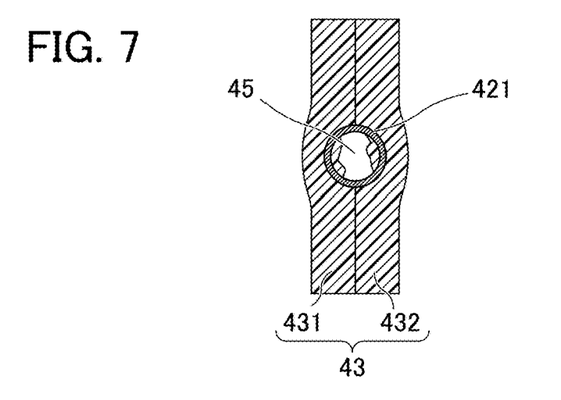
FIG. 7 is a view showing a cross section after interposing the RFID tag by rubber sheets in a case of not filling rubber inside a spring antenna.

First, a state of the surroundings of the RFID tag 40 in a case of not filling rubber into the spring antenna 421 will be explained as a reference example using FIGS. 6 to 8. FIG. 6 is a view showing a cross section of the spring antenna 421, and rubber sheets 431, 432, prior to interposing the RFID tag 40 by the rubber sheets 431, 432. FIG. 7 is a view showing a cross section of the spring antenna 421, and rubber sheets 431, 432, after interposing the RFID tag 40 by the rubber sheets 431, 432.

As shown in FIG. 7, in this reference example, since rubber is not filled into the spring antenna 421 in advance, a certain amount of air 45 may remain within the spring antenna 421 after interposing by the rubber sheets 431, 432. If air remains in this way, the integrity of the rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the rubber sheets 431, 432 herein. Consequently, by pushing the rubber sheets 431, 432 from both sides, the rubber sheets 431, 432 sticks to some extent inside the spring antenna as shown in FIG. 7. However, very large amounts of time and labor are required in order to stick the rubber sheets 431, 432 until the inside of the spring antenna is completely embedded.

Figure 8:
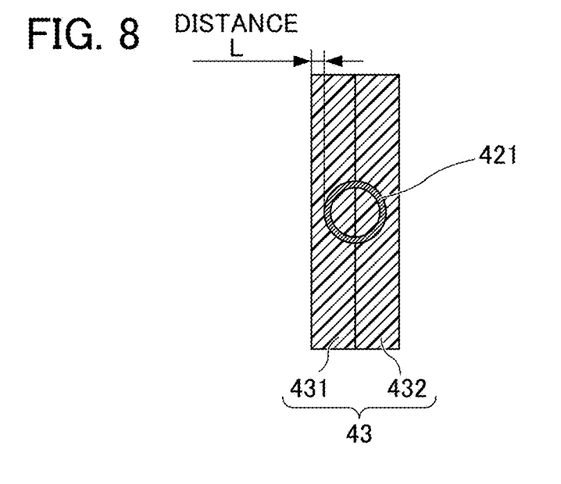
FIG. 8 is a view showing a cross section after interposing the RFID tag by rubber sheets in a case of not filling rubber inside a spring antenna.

Then, even if assuming a case of taking time and sticking the rubber sheets until the inside of the spring antenna is embedded, the distance L between the outer circumferential part of the spring antenna 421 and the outer surface of the rubber sheets 431, 432 becomes very short, as shown in FIG. 8. In addition, it is difficult to stabilize this distance L, and locally thin portions can occur. Consequently, the protection of the RFID tag 40 by the rubber sheets 431, 42 becomes insufficient, and during vulcanization, there is a possibility of the rubber sheets 431, 432 being damaged.

Therefore, in the present embodiment, prior to interposing the RFID tag 40 by the rubber sheets 431, 432, the rubber is arranged within the spring antenna 421, as shown in FIGS. 9 to 12. More preferably, rubber is filled within the spring antenna so that air does not remain as much as possible. It should be noted that the views shown on the right sides of FIGS. 9 to 12 are views showing a transverse section of the spring antenna 421 and the surrounding thereof.

Figure 9:
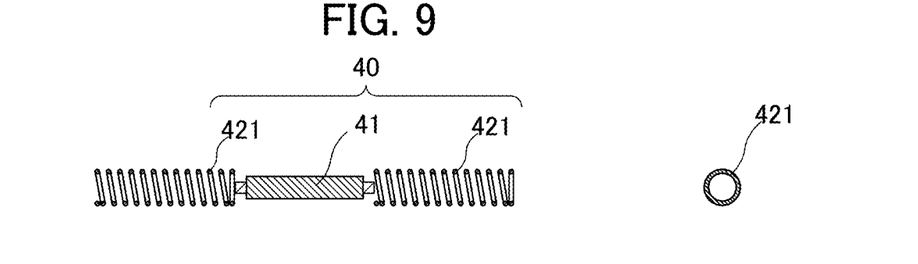
FIG. 9 is a view showing the RFID tag prior to filling rubber inside a spring antenna in a tire according to a third embodiment of the present invention.
Figure 10:
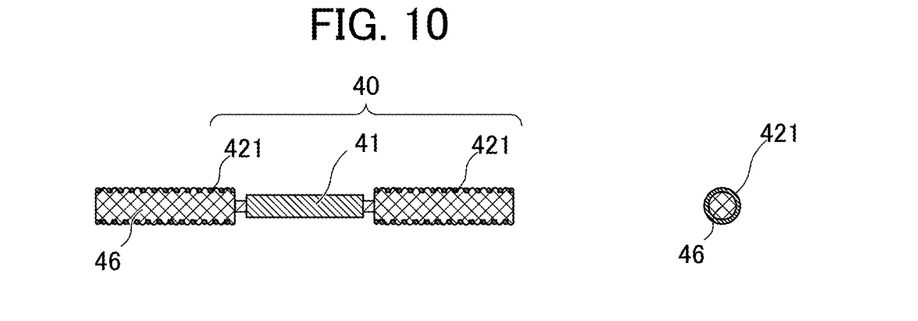
FIG. 10 is a view showing the RFID tag after filling rubber inside a spring antenna in a tire according to the third embodiment of the present invention.

FIG. 9 is a view showing a state prior to filling the rubber 46 into the spring antenna 421, and FIG. 10 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the rubber sheets 431, 432 as the rubber 46, in consideration of the workability, etc. It should be noted that preferably unvulcanized rubber is used as the rubber 46 arranged within the spring antenna 421. By establishing the rubber 46 and rubber sheets 431, 432 as unvulcanized rubber and vulcanizing simultaneously, the integrity of the rubber 46, rubber sheets 431, 432 and spring antenna 421 rises. In addition, the rubber 46, and rubber sheets 431, 432 are more preferably established as the same type of rubber. It should be noted that, by emphasizing the flexibility of the spring antenna 421, rubber of lower modulus than the rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 11:
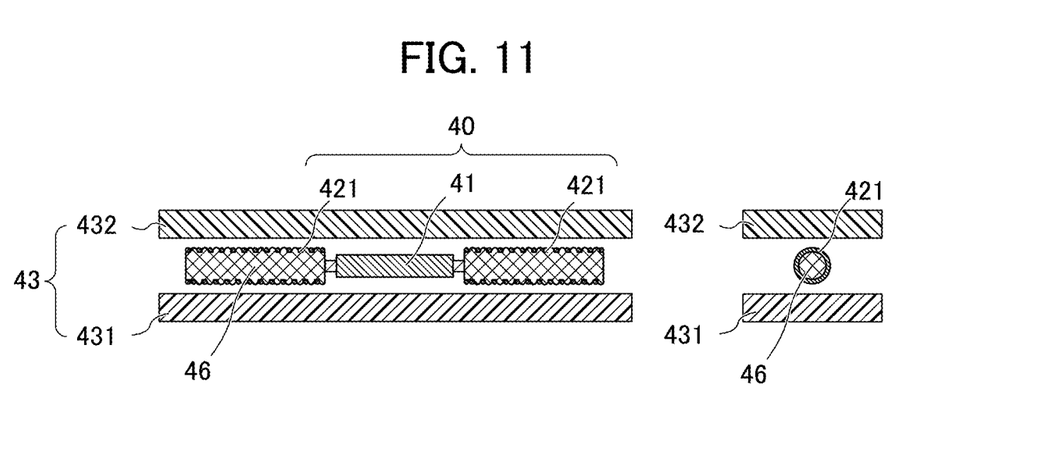
FIG. 11 is a view showing the RFID tag prior to interposing by rubber sheets, in a tire according to the third embodiment of the present invention.
Figure 12:
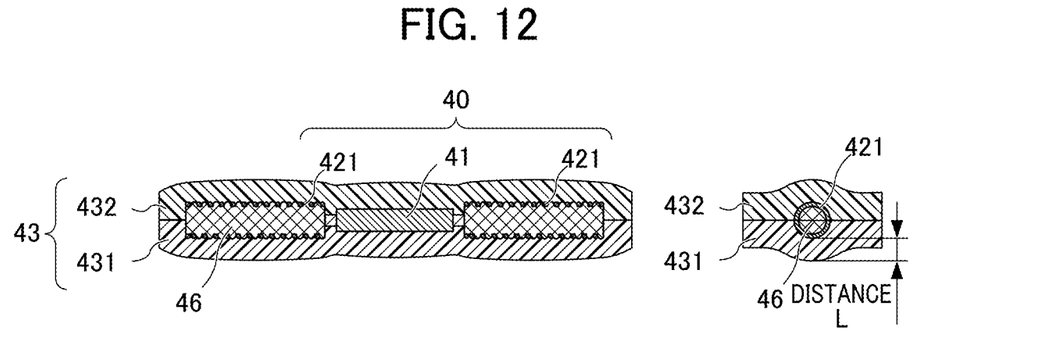
FIG. 12 is a view showing the RFID tag interposed by a rubber sheet, in a tire according to the third embodiment of the present invention.

FIG. 11 is a view showing a state prior to interposing the RFID tag 40 into which the rubber 46 is filled in the spring antenna 421, by the rubber sheets 431, 432, and FIG. 12 is a view showing a state after interposing by the rubber sheets 431, 432.

As shown in FIG. 12, according to the present embodiment, since the rubber 46 is filled in advance into the spring antenna 421, no air pockets exist between the rubber sheets 431, 432. Consequently, since it is unnecessary to be concerned over air pockets, the process of interposing the RFID tag 40 by the rubber sheets 431, 432 also becomes easy. In addition, by the rubber 46 being arranged within the spring antenna 421, the integrity of the spring antenna 421, rubber 46, and rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the rubber sheets 431, 432 stabilizes. In other words, a distance close to the thickness of the rubber sheets 431, 432 is generally secured as this distance L. Consequently, the RFID tag 40 is sufficiently protected by the rubber sheets 431, 432. In the present embodiment, the RFID tag 40 interposed by the rubber sheets 431, 432 is fixedly set up inside the green tire, and subsequently, the green tire is vulcanized.

According to the tire of the present embodiment, the following effects are exerted in addition to the above (1) to (6).

(7) The present embodiment provides a step of arranging the rubber 46 within the spring antenna 421 of the RFID tag 40 serving as an electronic component having a communication function; a step of interposing the RFID tag 40 having the spring antenna 421 into which the rubber 46 was arranged, by the rubber sheets 431, 432, and an arrangement step of arranging the RFID tag 40 interposed by the rubber sheets 431, 432 in the tire 1. The air 45 will thereby not remain inside the spring antenna 421. In addition, since it is unnecessary to be concerned about air pockets, the work of interposing the RFID tag 40 by the rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the rubber sheets 431, 432.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire comprising:
a bead core;
a bead filler which extends to an outer side in a tire radial direction of the bead core;
a carcass ply which extends from the bead core to another bead core and is folded around the bead core;
a reinforcement ply disposed so as to cover the carcass ply around the bead core;
a sidewall rubber and a rim strip rubber which constitute portions of an outer surface in a tire-width direction of the tire;
a rubber sheet covering an inner side in the tire-width direction of a folding end of the carcass ply which was folded back;
a first pad which covers and contacts an outer side in the tire-width direction of the folding end of the carcass ply which was folded back and an outer side in the tire-radial direction of an end part of the reinforcement ply, contacts outer sides in the tire-width direction of the rubber sheet and the bead filler, and extends outward in the tire radial direction; and
a second pad which covers an outer side in the tire-width direction of the first pad, and which is provided between the first pad and the rim strip rubber, and interiorly of the sidewall rubber in the tire-width direction, and contacts inner sides in the tire-width direction of the rim strip rubber and sidewall rubber;
wherein an electronic component is provided between the first pad and the second pad,
wherein the electronic component is provided at a position distanced by at least 5 mm from the folding end of the carcass ply, and
wherein the second pad extends outward in the tire radial direction and sequentially contacts outer sides in the tire width direction of the reinforcing ply, the first pad, bead filler and the carcass ply in the extending direction of the second pad.

2. The tire according to claim 1, wherein the electronic component is covered by at least one rubber sheet, and the rubber sheet covering the electronic component is disposed at a tire-radial direction outside end of the first pad.

3. The tire according to claim 1, wherein a modulus of the first pad and a modulus of the second pad are higher than a modulus of the bead filler.

4. The tire according to claim 1, wherein:
the electronic component is provided at a position distanced by at least 5 mm from a proximal part of the folding end of the carcass ply; and
the proximal part of the folding end of the carcass ply is prescribed by:
a point of intersection between a line extending from the folding end of the carcass ply in a direction orthogonal to an extending direction of the folding end of the carcass ply, and
a line showing a tire-width direction outside surface of the first pad, when viewed in a cross-sectional view in the tire-width direction.

* * * * *